United States Patent
Katayama et al.

(10) Patent No.: US 6,751,551 B2
(45) Date of Patent: Jun. 15, 2004

(54) NAVIGATION SYSTEM FOR VEHICLE

(75) Inventors: Mutsumi Katayama, Saitama (JP); Hiroyuki Morita, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/127,543

(22) Filed: Apr. 23, 2002

(65) Prior Publication Data

US 2002/0177949 A1 Nov. 28, 2002

(30) Foreign Application Priority Data

May 23, 2001 (JP) ........................................ 2001-154508

(51) Int. Cl.$^7$ ........................ G01C 21/00; G08G 1/0968
(52) U.S. Cl. ........................................................ 701/211
(58) Field of Search ................................. 701/211, 201, 701/208, 209, 210; 340/995.1, 995.2, 995.23, 995.27, 995.28

(56) References Cited

U.S. PATENT DOCUMENTS

| | | | | |
|---|---|---|---|---|
| 5,402,120 A | * | 3/1995 | Fujii et al. | 701/209 |
| 5,416,478 A | * | 5/1995 | Morinaga | 701/211 |
| 5,739,772 A | * | 4/1998 | Nanba et al. | 340/990 |
| 5,887,269 A | * | 3/1999 | Brunts et al. | 701/208 |
| 6,049,755 A | * | 4/2000 | Lou et al. | 701/207 |
| 6,138,073 A | * | 10/2000 | Uchigaki | 701/208 |
| 6,144,318 A | * | 11/2000 | Hayashi et al. | 701/209 |
| 6,269,304 B1 | * | 7/2001 | Kaji et al. | 701/209 |
| 6,430,501 B1 | * | 8/2002 | Slominski | 701/209 |

FOREIGN PATENT DOCUMENTS

JP 11-14390 1/1999

* cited by examiner

*Primary Examiner*—Tan Q. Nguyen
(74) *Attorney, Agent, or Firm*—Birch, Stewart, Kolasch & Birch, LLP (57) ABSTRACT

To provide a navigation system for a vehicle in which guidance information necessary for the driver can be provided while using a small display space. A guidance pattern indicating the direction toward a WP is formed of an arrow pattern including a center point segment with a rhombic segment as a tip. When the vehicle approaches a crossing and the turning direction at the crossing is to the right, the display pattern is changed over to an elongate rhombic segment extending rightwards from the center point segment, thereby indicating that the turning direction is to the right. Alternatively, the rhombic segment indicating the turning direction is displayed in addition to the guidance pattern for the direction toward the WP, whereby the direction toward the WP and the turning direction are displayed in combination so that they can be differentiated from each other.

20 Claims, 7 Drawing Sheets

| WP number | Position data | |
|---|---|---|
| 1 | N 35.40.09.00 | E 139.43.37.5 |
| 2 | . . . . . . . . . . . . . . . . . . . . | |
| 3 | . . . . . . . . . . . . . . . . . . . . | |
| 4 | . . . . . . . . . . . . . . . . . . . . | |
| ⋮ | ⋮ | |
| 9 | . . . . . . . . . . . . . . . . . . . . | |

NAVIGATION SYSTEM FOR VEHICLE

CROSS-REFERENCE TO RELATED APPLICATIONS

This non-provisional application claims priority under 35 U.S.C. §119(a) on Patent Application No. 2001-154508 filed in Japan on May 23, 2001, the entirety of which is herein incorporated by reference.

BACKGROUND OF THE INVENTION

1. Field of the Invention

The present invention relates to a navigation system for a vehicle. In particular, the present invention relates to a navigation system for vehicle, which is suitable for a small vehicle in which it is difficult to secure a large display space.

2. Description of Background Art

Navigation systems for displaying the current position of a vehicle on a map by a combination of a position detector (GPS) utilizing satellite electromagnetic waves and map information and for providing guidance to a destination are widely used.

Hitherto, navigation systems for a vehicle have been developed mainly for four-wheel vehicles. However, in recent years, mounting of a navigation system on small-type vehicles such as motorcycles and all terrain vehicles (ATVs) for off-road driving has been investigated. The conventional navigation systems have a problem in that the display screen is enlarged due to the desire for providing the driver with a large amount of information. In the cases of small-type vehicles such as motorcycles, it has been difficult to secure a space for mounting the display panel in the field of vision of the driver.

Figure 9:
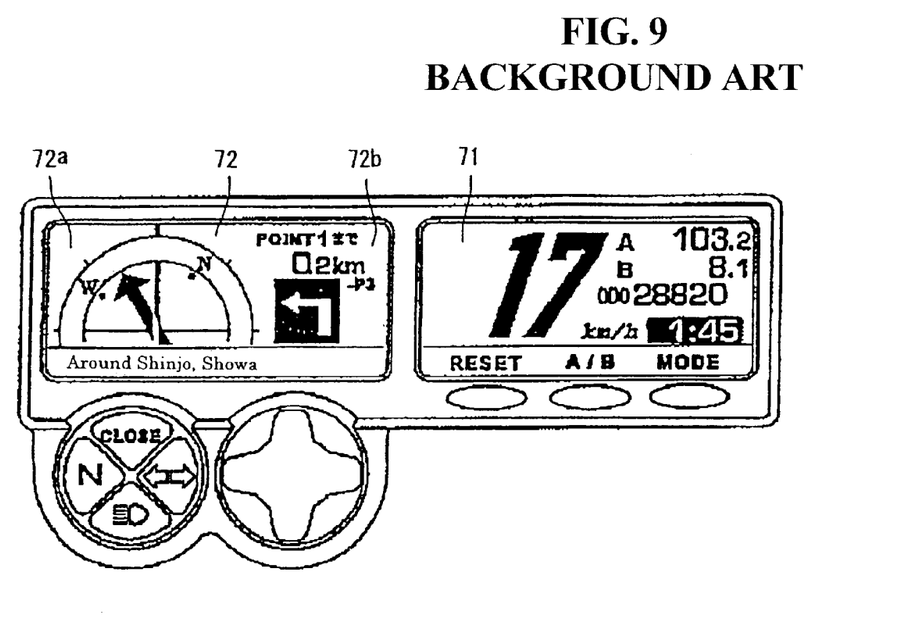
FIG. 9 shows the construction of a meter panel of a background art navigation system for a motorcycle.

FIG. 9 shows the construction of a meter panel of a background art navigation system for a motorcycle, which is disclosed in Japanese Patent Laid-open No. Hei 11-14390. In the above document, navi display panel 72 for simply displaying guidance information by the navigation system is provided adjacent to a display panel 71 for displaying information such as the running speed and the distance traveled.

A guidance pattern for guiding the direction of a pre-registered predetermined transit point and a guidance pattern for guiding the direction to which the vehicle is to be turned at the transit point are displayed respectively in different regions 72a, 72b on the same screen. Therefore, the navi display panel 72 is enlarged in the lateral direction and, particularly in the cases of small-type vehicles, it has been technically difficult to secure the installation space.

SUMMARY OF THE INVENTION

It is an object of the present invention to provide a navigation system for a vehicle by which the above-mentioned problems in the background art can be solved and guidance information necessary for the driver can be provided while using a small display space.

In order to attain the above object, the present invention is directed to a navigation system for displaying a plurality of kinds of guidance patterns differing in meaning given. A sole display region for displaying the guidance patterns simultaneously or selectively is provided. Furthermore, the guidance patterns are displayed in the display region in visually different display modes according to the respectively intrinsic meanings given.

According to the above characteristic features, a plurality of kinds of guidance patterns can be displayed in the sole display region, so that a large amount of guidance information can be obtained even when it is impossible to sufficiently secure space for a display region for a navigation system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
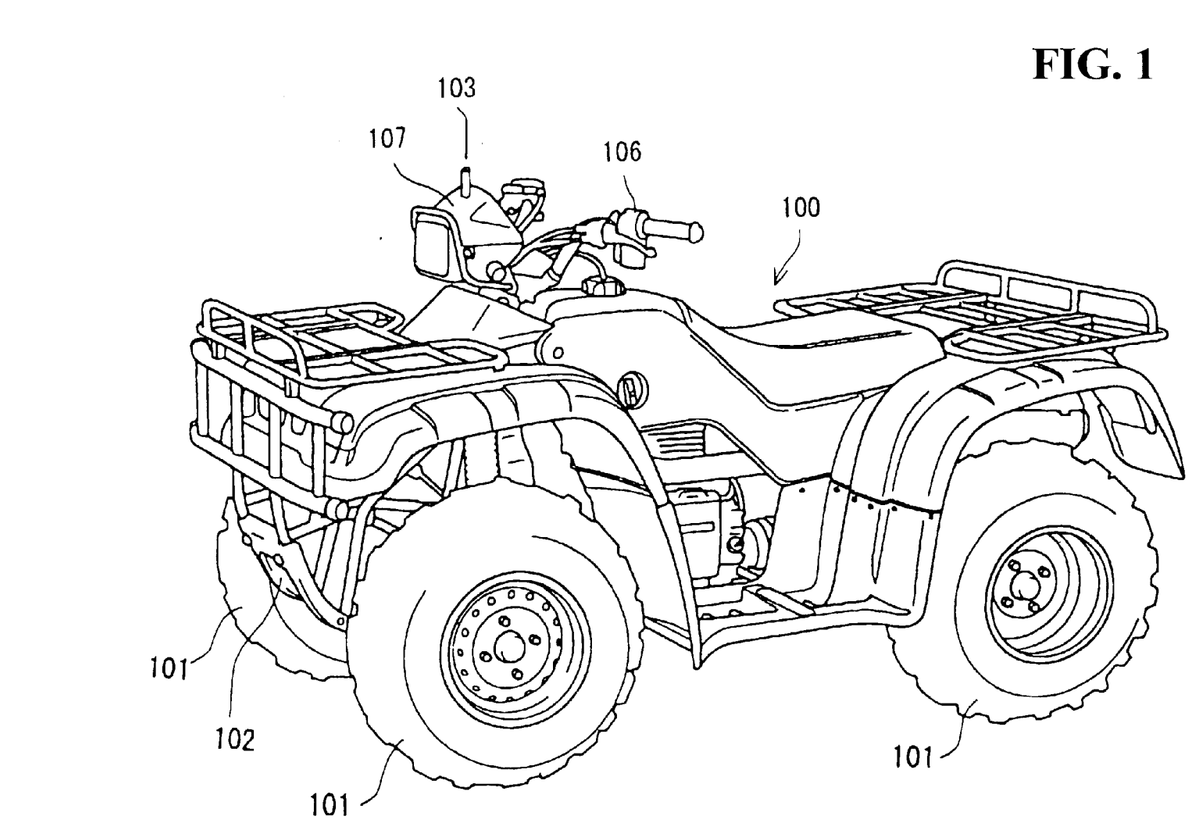
FIG. 1 is a perspective view of an all terrain vehicle for off-road driving on which a navigation system according to the present invention is mounted.

The present invention will now be described in detail below with reference to the accompanying drawings. FIG. 1 is a perspective view of an all terrain vehicle (ATV) 100 for off-road driving on which a navigation system according to the present invention is mounted. The ATV displays a high slope ascending property and a covering-the-distance property by making use of large-diameter wheels 101, an under cover 102, a four wheel drive mechanism and the like.

A meter unit 107 is provided at a central portion of a handle 106. A helical type global positioning system (GPS) reception antenna 103 is erected toward the sky at an upper portion of the meter unit 107. The ATV 100 is often used off-road where the terrain is varied such that the posture of the ATV is varied. However, by adopting a helical antenna with a wide directivity as the reception antenna 103, GPS electromagnetic waves can be favorably received irrespective of the variations in the posture of the ATV.

Figure 2:
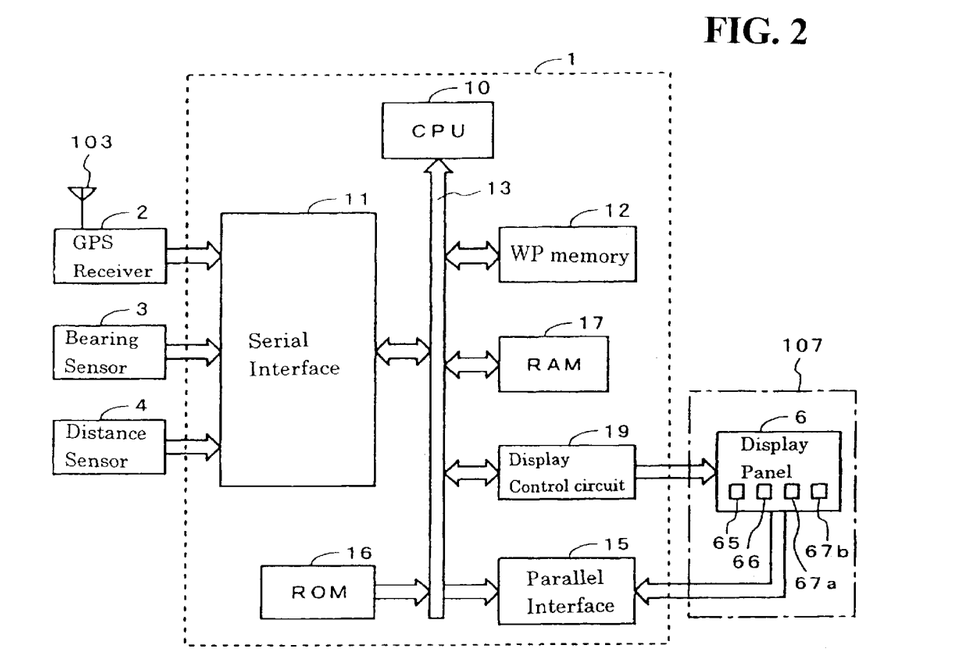
FIG. 2 is a block diagram of the navigation system mounted on the vehicle of FIG. 1.

FIG. 2 is a block diagram showing the construction of a major portion of the navigation system 1 mounted on the ATV 100. It should be noted that the same symbols have been used to identify the same or similar elements as in FIG. 1.

A GPS (Global Positioning System) receiver 2 receives signals from artificial satellites, and measures the current position (latitude and longitude) of the vehicle. A bearing sensor 3 detects the current position and the direction of the vehicle. A distance sensor 4 detects the distance traveled by the vehicle. The GPS receiver 2, the bearing sensor 3 and the distance sensor 4 are connected to a system bus 13 through a serial interface 11.

A CPU 10 determines the current position of the vehicle based on data acquired from the GPS receiver 2, the bearing sensor 3 and the distance sensor 4. A control program is pre-stored in a ROM 16. Furthermore, the CPU 10 computes the relative positional relationship between a way point (WP: transit point) pre-registered in a WP memory 12 and the current position of the vehicle. A RAM 17 provides the CPU 10 with a working area.

A display control circuit 19 outputs the direction of the WP as viewed from the current position, the distance therebetween and the like to a display panel 6 of the meter unit 107. Switches 65, 66, 67a, 67b of the display panel 6 are connected to the system bus 13 through a parallel interface 15.

Figure 3:
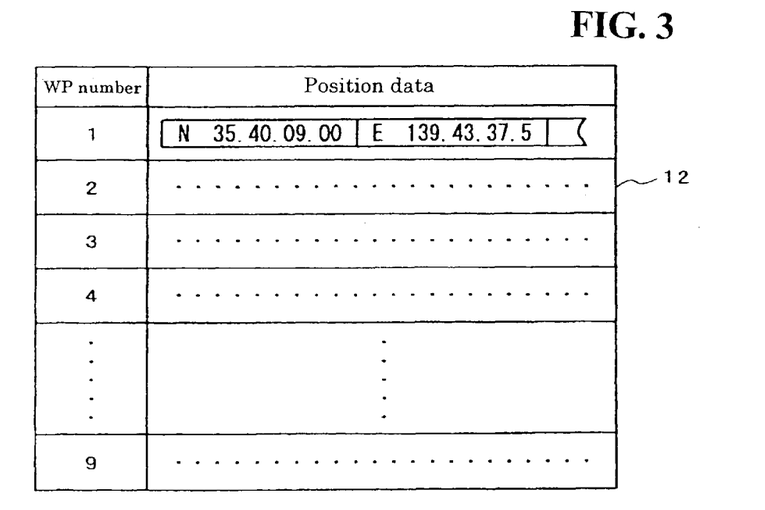
FIG. 3 expresses schematically the contents stored in a WP memory.

FIG. 3 schematically represents the contents stored in the WP memory 12. In the WP memory, a storage region is secured for each WP number as identification data of the WP. The latitude and longitude of the WP are stored in each storage region as position data of each WP.

Figure 4:
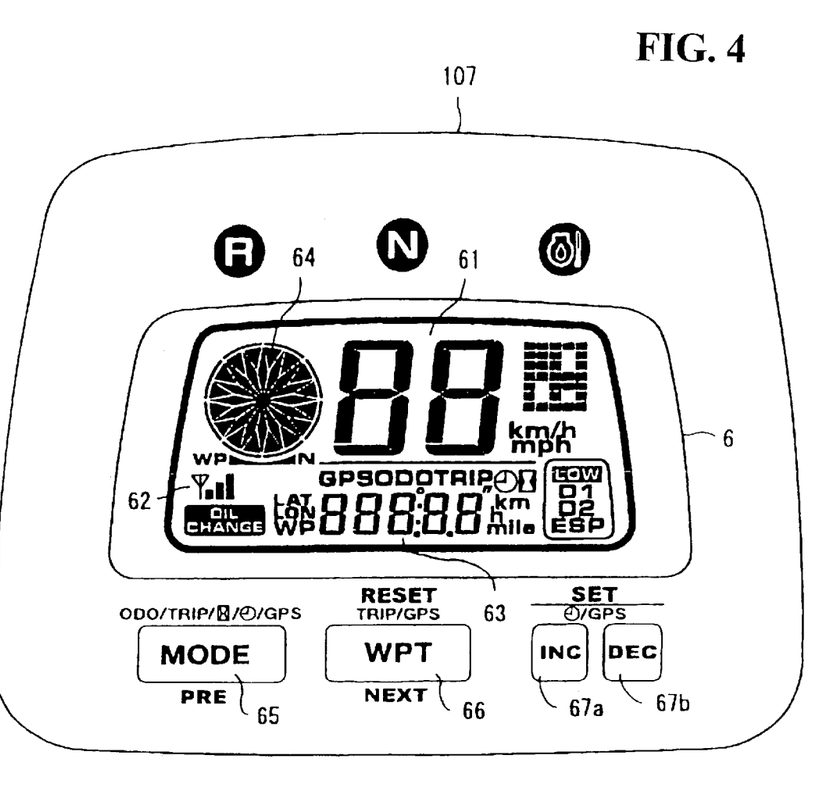
FIG. 4 shows the constitution of a display panel.

FIG. 4 shows the construction of the display panel 6, which includes a speed display region 61. A sensitivity display region 62 is provided for displaying the GPS reception conditions. A multiple display region 63 is provided for functioning as an odometer and a trip meter and displays the number of the WP currently selected and the distance to the WP. A direction display region 64 is provided for displaying the direction of the WP and the final destination in terms of 16 bearings.

On the lower side of the display panel 6, there are provided a "MODE" switch 65 for changeover of operational mode of the navigation system, a "WPT" switch 66 for newly registering the current position of the WP, and an "INC" switch 67a and a "DEC" switch 67b for selecting the WP. Other display contents are not important in understanding the present invention. Therefore, description thereof has been omitted.

Figure 5:
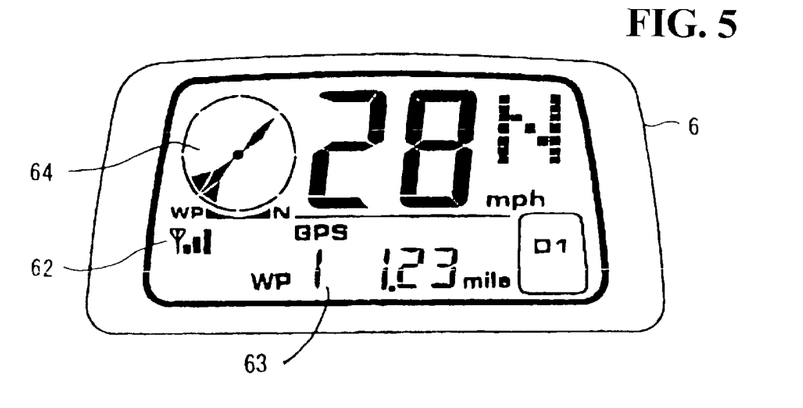
FIG. 5 shows a display example of a meter panel during running of a vehicle.

FIG. 5 shows a display example of the meter panel 6 during running of the vehicle. A reception sensitivity condition is displayed in the sensitivity display region 62. The identification number "1" of the way point WP and the distance "1.23" (miles) from the current position to the way point WP1 are displayed in a distance-traveled display region 63.

In a direction display region 64, a guidance pattern indicating the direction toward the WP is normally displayed as guidance information for guiding the vehicle to WP1. When a crossing or a branch path is approached, a guidance pattern indicating a turning direction is displayed in place of the guidance pattern indicating the direction toward the WP or together with the guidance pattern indicating the direction toward the WP.

Figure 6A:
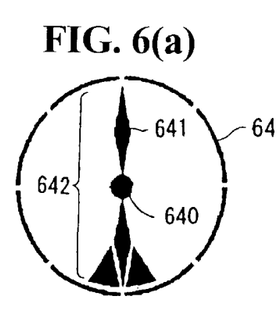
FIGS. 6(a) to 6(c) show a display changeover example (No. 1) of a direction display region 64.
Figure 6B:
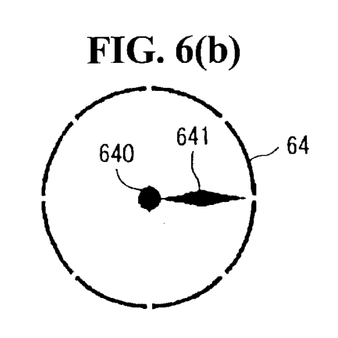
Figure 6C:
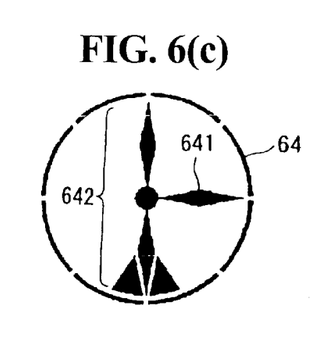

FIGS. 6, 7 and 8 show display examples in the case of momentarily changing over the displayed contents to the turning direction (or a combined display of the direction toward the WP and the turning direction) as the vehicle approaches a branch path (for example, a crossing) in the condition where the direction toward the WP is displayed in the direction display region 64.

In FIG. 6, the direction toward the WP and the turning direction can be differentiated from each other by providing a difference in shape (turning-on pattern of segments) of the guidance patterns indicating the directions. In this embodiment, the guidance pattern intrinsic of the direction toward the WP is constituted of an arrow pattern 642 including a center point segment 640 with a rhombic segment 641 as the tip. In FIG. 6(a), it is indicated that the direction toward the WP is the straight forward direction.

When the vehicle approaches a crossing and the turning direction at the crossing is to the right, in the embodiment shown in FIG. 6(b), the display pattern is changed over to an elongate rhombic segment 641 extending rightwards from the center point segment 640, whereby it is indicated that the turning direction is to the right.

In an embodiment shown in FIG. 6(c), the rhombic segment 641 indicating the turning direction is displayed in addition to the guidance pattern 642 for the direction toward the WP. The direction toward the WP and the turning direction are displayed in combination so that they can be differentiated from each other.

Thus, according to the present embodiment, the two pieces of guidance information; namely, the turning direction and the direction toward the WP can be displayed in combination in the same display region. Accordingly, a plurality of pieces of guidance information necessary for the driver can be provided while using a small display space.

Furthermore, in this embodiment, a part (rhombic segment 641) of the guidance pattern for the direction toward the WP coincides with the guidance pattern for the turning direction. Accordingly, the guidance patterns can be displayed in a large size while retaining the function of differentiating between the guidance patterns.

In FIG. 7, the direction toward the WP and the turning direction can be differentiated from each other by reversing the turned-on condition of the guidance patterns for the two directions.

Figure 7A:
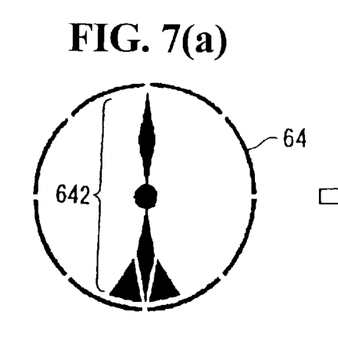
FIGS. 7(a) to 7(d) show a display changeover example (No. 2) of the direction display region 64.
Figure 7B:
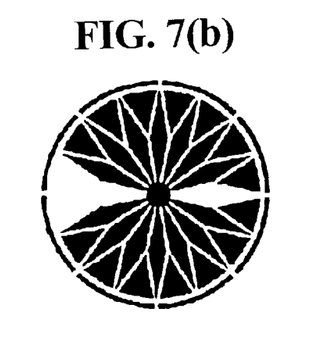
Figure 7C:
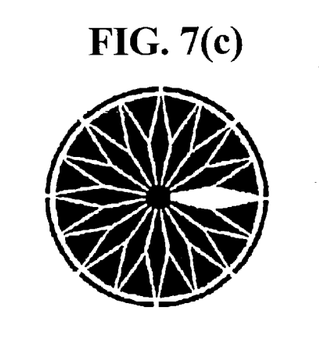
Figure 7D:
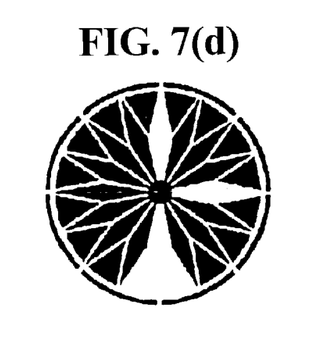

In this embodiment, when the vehicle approaches a branch path in the condition where the guidance pattern 642 indicating the direction toward the WP is displayed as shown in FIG. 7(a), in the embodiment shown in FIG. 7(b) a white-blanked guidance pattern having the same shape as the guidance pattern 642 for the direction toward the WP is displayed to indicate the turning direction. In the embodiment shown in FIG. 7(c), a white-blanked rhombic pattern having the same shape as the guidance pattern for the turning direction shown in FIG. 6(b) is displayed to indicate the turning direction. In the embodiment shown in FIG. 7(d), the guidance pattern 641 of FIG. 6(c) is reversed, whereby the direction toward the WP and the turning direction are displayed in combination so that they can be differentiated from each other.

In FIG. 8, the direction toward the WP and the turning direction can be differentiated from each other by making the turned-on condition of the guidance patterns different (turned-on or blinking).

Figure 8A:
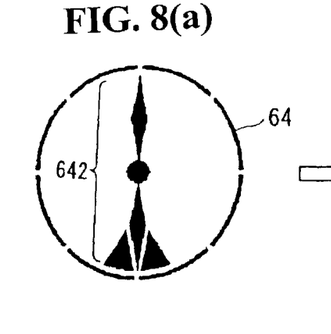
FIGS. 8(a) to 8(e) show a display changeover example (No. 3) of the direction display region 64.
Figure 8B:
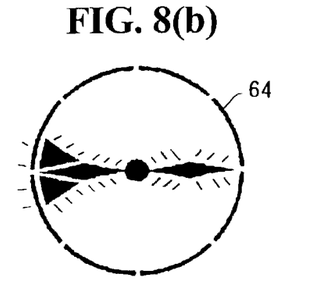
Figure 8C:
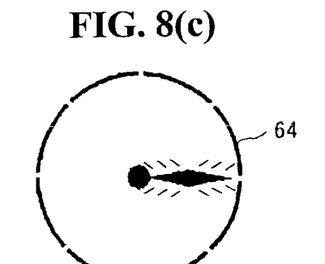

In this embodiment, when the vehicle approaches a branch path in the condition where a guidance pattern 642 indicating the direction toward the WP is displayed as shown in FIG. 8(a), in the embodiment shown in FIG. 8(b) a guidance pattern of the same shape as the guidance pattern 642 for the direction toward the WP blinks to indicate the turning direction. In the embodiment shown in FIG. 8(c), a rhombic pattern of the same shape as the guidance pattern 641 for the turning direction shown in FIG. 6(b) blinks to indicate the turning direction. In the embodiment shown in FIG. 8(d), only a rhombic pattern 641 indicating the turning direction, of the guidance pattern of FIG. 6(c), blinks, whereby the direction toward the WP and the turning direction are displayed in combination so that they can be differentiated from each other.

Figure 8D:
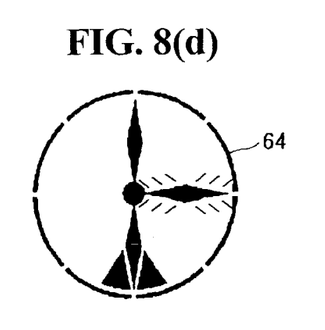
Figure 8E:
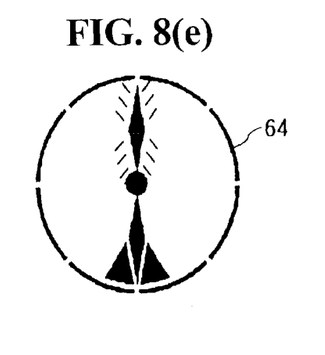

Thus, in this embodiment, the guidance pattern for the turning direction and the guidance pattern for the direction toward the WP are made to differ not only in shape but also in the turning-on method. Therefore, not only in the case where the turning direction and the direction toward the WP are different as shown in FIG. 8(d) but also in the case where the two directions are the same, as shown in FIG. 8(e), the two directions can be easily differentiated from each other.

While the guidance pattern for the turning direction and the guidance pattern for the direction toward the WP have been described to be differentiated from each other by changing the shape or the turning-on system of the two directions in the above embodiments, the present invention is not limited to or by the above embodiments. Namely, the two directions may be differentiated from each other by changing the color or density of the two directions.

According to the present invention, the following effects can be achieved.

Two pieces of guidance information; namely, the turning direction and the direction toward a WP can be displayed in combination in the same display region. Accordingly, a plurality of pieces of guidance information necessary for the driver can be provided while using a small display space.

A part of the guidance pattern for the direction toward the WP coincides with the guidance pattern for the turning direction. Accordingly, the guidance patterns can be displayed in a large size while retaining the function or differentiating the two directions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation system for a vehicle for displaying a plurality of kinds of guidance patterns differing in intrinsic meaning, comprising:
a sole display having a plurality of display regions, at least one of said plurality of display regions for displaying said plurality of kinds of guidance patterns simultaneously or selectively,
wherein said plurality of kinds of guidance patterns are displayed in each of said at least one display region in visually different display modes according to their intrinsic meaning and said at least one of said plurality of display regions is a direction display region, said direction display region displaying a guidance pattern indicating a direction toward a WP which coincides with a guidance pattern indicating a turning direction.

2. The navigation system for a vehicle as set forth in claim 1, wherein a part of one of said guidance patterns coincides with at least a part of another of said guidance patterns.

3. The navigation system for a vehicle according to claim 2, wherein said guidance patterns differ in shape according to their intrinsic meaning.

4. The navigation system for a vehicle according to claim 2, wherein said guidance patterns are turned on differntly according to their intrinsic meaning.

5. The navigation system for a vehicle according to claim 2, wherein said guidance patterns differ in display color according to their intrinsic meaning.

6. The navigation system for a vehicle according to claim 2, wherein said guidance patterns differ in display density according to their intrinsic meaning.

7. The navigation system for a vehicle according to claim 1, wherein said guidance patterns differ in shape according to their intrinsic meaning.

8. The navigation system for a vehicle according to claim 1, wherein said guidance patterns are turned on differently according to their intrinsic meaning.

9. The navigation system for a vehicle according to claim 1, wherein said guidance patterns differ in display color according to their intrinsic meaning.

10. The navigation system for a vehicle according to claim 1, wherein said guidance patterns differ in display density according to their intrinsic meaning.

11. A navigation system for a vehicle for displaying a plurality of kinds of guidance patterns, each of the guidance patterns for identifying a different guidance parameter, comprising:
a display having a plurality of display regions, at least one of said plurality of display regions for respectively displaying said plurality of kinds of said guidance patterns simultaneously or individually,
wherein said plurality of kinds of guidance patterns are displayed in each of said at least one display region in visually different display modes according to the guidance parameter being identified and said at least one of said plurality of display regions is a direction display region, said direction display region displaying a guidance pattern indicating a direction toward a WP which coincides with a guidance pattern indicating a turning direction.

12. The navigation system for a vehicle as set forth in claim 11, wherein a part of one of said guidance patterns coincides with at least a part of another of said guidance patterns.

13. The navigation system for a vehicle according to claim 12, wherein said guidance patterns differ in shape according to the guidance parameter being identified.

14. The navigation system for a vehicle according to claim 12, wherein said guidance patterns are turned on differently according to the guidance parameter being identified.

15. The navigation system for a vehicle according to claim 12, wherein said guidance patterns differ in display color according to the guidance parameter being identified.

16. The navigation system for a vehicle according to claim 12, wherein said guidance patterns differ in display density according to the guidance parameter being identified.

17. The navigation system for a vehicle according to claim 11, wherein said guidance patterns differ in shape according to the guidance parameter being identified.

18. The navigation system for a vehicle according to claim 11, wherein said guidance patterns are turned on differently according to the guidance parameter being identified.

19. The navigation system for a vehicle according to claim 11, wherein said guidance patterns differ in display color according to the guidance parameter being identified.

20. The navigation system for a vehicle according to claim 11, wherein said guidance patterns differ in display density according to the guidance parameter being identified.

* * * * *